United States Patent Office 2,889,232
Patented June 2, 1959

2,889,232

ZIRCONIUM OXIDE CONTAINING PRODUCT AND METHOD OF PRODUCING SAME

Robert H. Linnell, Blawenburg, N.J., assignor to Titanium Zirconium Company, Inc., Flemington, N.J., a corporation of New Jersey No Drawing. Application June 22, 1956
Serial No. 593,029

8 Claims. (Cl. 106—299)

This invention relates to a new type of product embodying zirconium oxide and to methods of producing and using such products.

Zirconium oxide has many uses as a pigment, a constituent of ceramic colors, and as an opacifier in the ceramic industry. It is also useful in the compounding of rubber, as a cementing or bonding agent and in many other fields.

At the present time most of the zirconium oxide used in industry is produced by heating zirconium ore (zirconium silicate) with carbon in an electric furnace to produce the carbonitride which is thereafter oxidized. However, the resulting product contains from about 2 to 10% or more of impurities which are undesirable for many purposes.

When relatively pure zirconium oxide is desired, it is usual to fuse the zircon ore with an alkali to produce the hydrous oxide which is thereafter purified and treated with sulfuric acid forming the sulfate which is calcined to drive off $SO_3$ leaving pure zirconium oxide. In the alternative, basic zirconium sulfate may be produced and calcined to obtain the oxide.

All of these processes are relatively expensive to carry out, particularly when a product of high quality is desired. Moreover, if it should be desirable for any reason to have zirconium silicate present in a composition, it is necessary to add the silicate in the form of zirconium ore or otherwise to the zirconium oxide produced.

In accordance with the present invention, a new type of zirconium oxide product is provided which has important new uses and properties and novel methods of producing and using such products have been developed.

The products of the present invention consist of or include a body having a coating of zirconium oxide or a mixture of zirconium oxide and silica thereon. This coating is formed in situ on the body by decomposition of zirconium sulfate or other salts of zirconium. Such zirconium oxide coated bodies may be used in place of pure zirconium oxide and have many new uses and properties rendering them important in a wide variety of composition and industrial processes. They are particularly useful in the production of ceramic colors. In fact, the methods of the present invention may be carried out in such a way as to produce ceramic colors directly from zirconium silicate ores.

The principal object of the present invention is to provide a new type of zirconium oxide containing product.

Another object of the invention is to provide a new product consisting of or including finely divided particles having a coating of zirconium oxide on the surface thereof.

A further object of the invention is to provide novel methods for producing zirconium oxide coated particles or bodies.

A specific object of the invention is to provide a novel type of product, such as ceramic colors, opacifiers and the like, which are useful in the ceramic industry and which embody zirconium oxide.

Another object of the invention is to produce ceramic colors directly from zirconium silicate ores.

These and other objects and features of the present invention will be apparent from the following description thereof wherein typical compositions and methods of procedure are described for the purpose of indicating the nature of the invention and preferred methods of making and using the products thereof, but without intending to limit the scope of the invention thereby.

The formation of a coating of zirconium oxide upon the surface of a body can be effected in various ways in accordance with the present invention. In a preferred form of the invention, zirconium ore, consisting essentially of zirconium silicate, is treated with sulfuric acid. The reaction which takes place may be represented by the equation

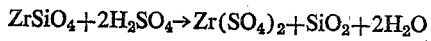

The action of sulfuric acid upon zirconium silicate takes place relatively slowly and requires drastic treatment if all of the silicate is to be converted into the sulfate. However, if the ore is ground into relatively fine particles, the surface of the particles is attacked so as to produce a coating of zirconium sulfate thereon while the body or core of each particle remains substantially unaffected.

In accordance with the present invention, such surface treated particles are produced and are then calcined to convert the sulfate to the oxide in accordance with the equation

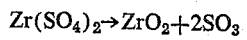

The product obtained by calcining the surface treated particles therefore consists of a body of zirconium silicate having the surface thereof coated with zirconium oxide. The coating may also contain free silica and, in some instances, may contain impurities such as the sulfates of calcium and iron. When any one or more of these constituents is undesirable, the zirconium oxide coated particles may be further treated to eliminate or reduce the amount of impurities in the coating.

In an alternative form of the present invention, zirconium sulfate or other water soluble zirconium salts, produced in any preferred manner, may be applied to a body of material and converted into the oxide in situ so as to provide a body having a surface coating of pure zirconium oxide thereon. A coating of zirconium oxide may thus be developed in situ on substantially any type of base such as flint, sand, clay, wood flour, or even fibrous or resinous materials. If desired, a solution of a soluble zirconium salt may be applied to the sulfate coated particles produced from zirconium ore so as to enrich the coating of the zirconium sulfate produced by acid treatment. In this way a thicker and sometimes a purer coating of zirconium oxide may be developed on the surface of zirconium silicate particles.

The thickness of the surface coating of zirconium oxide may be varied by varying the length of the acid treatment of the ore or by addition of soluble salts to the body on which the coating is to be formed. Furthermore, the manner in which the surface coating of zirconium oxide is produced or applied to the body will depend largely upon the nature of the body being treated and the end use for which the zirconium oxide coated product is desired.

In producing ceramic colors and opacifiers, it is preferable to employ material having a fine particle size. For this purpose zirconium silicate ore may be ground to a fineness of at least 200 mesh and preferably to 300 or even 400 mesh before being treated with sulfuric acid and calcined. The calcined product further may be purified by treatment with hydrochloric acid to remove calcium and iron present in the coating so that the coating will contain substantially pure zirconium oxide and silica. Since silica is often desirable in ceramic colors the product can generally be used directly in ceramic colors without further treatment.

In some instances, it is found desirable to mix the sulfate coated particles with water to form a slurry whereby part or all of the zirconium sulfate will be dissolved from the particles. The slurry may then be rendered alkaline with ammonia to produce the insoluble hydrous zirconium oxide. The slurry is then filtered to remove ammonium sulfate and the filter cake will then contain finely divided zirconium silicate and finely divided silica mixed with hydrous zirconium oxide. The filter cake may then be broken up and calcined to produce the desired zirconium oxide coated particles.

When flint, ammonium vanadate, or other additives are desired in a ceramic color, the flint and additives and the zirconium silicate ore may be mixed together prior to treatment with sulfuric acid whereby at least a portion of the zirconium sulfate produced and present in the mixture will be deposited on the surface of the flint and other additives. The resulting mixture will therefore consist of particles of zircon coated with zirconium sulfate together with particles of flint and other additives having a surface coating of zirconium sulfate thereon. This mixture, when calcined, will consist of particles of zircon, flint, ammonium vanadate, and the like, all of which are coated with zirconium oxide. Other additives which are not adversely affected by the sulfuric acid treatment and the calcining operation may be mixed with flint and zirconium ore so as to be coated with zirconium oxide in the direct production of ceramic colors. If preferred, these or other additives may be incorporated in the mix after calcining as desired.

The treatment of zirconium silicate ore with sulfuric acid apparently serves to etch the surface of the silicate particles or to result in penetration of the acid into crevices in the surface of the particles so that upon subsequent calcining of the zirconium sulfate coated particles, the coating of zirconium oxide formed adheres tenaciously to the core or body of each particle and, in effect, becomes integral therewith. Essentially the same result appears to occur when flint and zirconium silicate ore are mixed together and treated with sulfuric acid in that the zirconium sulfate produced is partially dissolved in the acid and penetrates or bonds itself to the flint whereby the subsequently formed zirconium oxide adheres tenaciously to the surface of the flint.

As a further modification of the present invention, aqueous solutions of soluble zirconium salts may be applied to the surface of material such as sand, clay, wood flour, rock wool, asbestos or resinous or fibrous material. The coated product may then be treated to convert the zirconium compound in situ into zirconium oxide. Thus, aqueous solutions of zirconium sulfate, zirconium oxychloride, zirconium nitrate, zirconium acetate and complexes such as ammonium zirconyl carbonate may be employed. The body to be coated with zirconium oxide may be immersed in an aqueous solution of a zirconium salt or the solution may be sprayed onto, or otherwise applied, to the body so that the body is coated with zirconium compound. Thereafter the coated body may be calcined, dried or otherwise treated to convert the soluble salt into the oxide so as to produce the desired zirconium oxide coated body or particle.

In a further alternative form of the present invention, soluble zirconium salts may be precipitated onto particles or bodies by means of an alkali so as to form thereon a coating of hydrous zirconium oxide ($ZrO_2 \cdot XH_2O$). The product may then be dried or calcined whereby part or all of the water of the hydrous oxide will be driven off leaving a coating which is largely composed of zirconium oxide. Since the removal of all of the water from hydrous zirconium oxide generally requires drastic treatment, prolonged calcining may sometimes be desired. On the other hand, in most cases, as when treating wood flour, the coated or impregnated particles need only be dried at an elevated temperature in order to produce a product adapted for use in molding plastic products.

When the body on which the coating of zirconium oxide is to be formed would be destroyed or impaired by calcining or excessive drying, it is generally desirable to use soluble zirconium salts which are decomposed at relatively low temperatures. Thus, for example, an aqueous solution of ammonium zirconyl carbonate may be used in treating wood flour or the like, after which the product may be dried for a relatively short time, or at a lower temperature with resulting decomposition of the zirconyl complex and the formation of a coating of zirconium oxide in situ on the surface of the base material. Instead of using ammonium zirconyl carbonate, it is possible to use sodium zirconium lactate, sodium zirconium glycolate, sodium zirconium tartrate and similar zirconium complexes.

When using any of the methods described above for forming a coating of zirconium oxide upon the surface of a body, the coating is produced in situ and is found to adhere firmly to the body and to coat the body effectively. The characteristic white color of zirconium oxide is thus developed on the body.

In order to illustrate typical procedure in accordance with the present invention, the following examples are cited:

*Example I*

100 parts of milled zircon, of which 99.9% will pass a 325 mesh screen, is heated with 184 parts of 98% sulfuric acid until a gentle evolution of $SO_3$ takes place. Heating is continued for a period of several hours at a temperature about 300° C. with further additions of sulfuric acid as required. During the final stages of heating no further sulfuric acid is added and the sulfuric acid present is allowed to decompose, whereby there is obtained a fine, dry, granular product consisting of zirconium silicate particles coated with zirconium sulfate. The product thus obtained is then calcined to about a temperature of 1000° C., yielding a fine, white soft powder which is suitable for use directly as an opacifier in ceramic products, as a pigment for use in paints and as an extender, or otherwise, in rubber compounding.

*Example II*

1350 parts of milled zircon, 98% of which will pass a 325 mesh screen, 920 parts of 94% sulfuric acid were mixed to a smooth slurry and heated at about 175 to 200° C. for several hours until excess sulfuric acid was removed. The product, a white powder, was analyzed for soluble zirconium and contained 3.93% $ZrO_2$ by weight in a soluble form. This sulfated zircon was then calcined at 1000° C. yielding a fine, white powder useful in the ceramic arts.

*Example III*

100 parts of the product from Example II was heated with agitation with about 5 Normal hydrochloric acid at 80° C. for 1 hour, then filtered and washed acid free. After drying at 110° C. the product is useful in ceramic arts, for example. This treatment removes part of the iron, calcium, and other impurities.

*Example IV*

500 parts of milled zircon, 99.9% of which passed a 325 mesh screen, were mixed in a ball mill with 125 parts of flint. 40 parts of this mixture and 55 parts of 98% sulfuric acid were heated with continuous evolution of $SO_3$ until all the sulfuric acid had been removed. The mixture was then calcined for one hour at 1000° C. producing a product consisting of an intimate mixture of particles of zircon and flint, each of which was coated with zirconium oxide.

Example V 20.1 parts of the product obtained in Example I, 5 parts of flint, 1 part of ammonium vanadate and 0.5 part of sodium fluoride were mixed together and heated to 900° C. for about two hours. The product obtained was a blue colored material suitable for use as a ceramic color.

Example VI 12 parts of milled zircon, 98% of which will pass a 325 mesh screen, 1 part of ammonium vanadate and 0.5 part of sodium fluoride were mixed with 29.5 parts of 98% sulfuric acid and the mixture heated to a temperature about 300° C. A gentle evolution of $SO_3$ occurred and heating was continued for a period of several hours until no more $SO_3$ fumes were evolved. The mixture was then calcined at 1000° C. for two hours, whereupon a product having a good yellow color and suitable for use as a ceramic color was obtained by direct treatment of zirconium ore.

Example VII 30 parts of finely ground zircon were heated to 1000° C. and dropped into 200 parts of cold water, whereby fissures were formed in the surface of the zircon particles. 46 parts of 98% sulfuric acid were then added to the quenched and dried zircon and the mixture evaporated to dryness. The resulting cake was then broken up and heated for one hour at 1000° C. This product may be used as an opacifier or for making ceramic colors.

Example VIII 85 parts of zirconium sulfate were dissolved in 350 parts of water and 1150 parts flint were mixed with the solution. The resulting mixture was then dried and heated to 1000° C. whereby the flint particles were provided with a surface coating of zirconium oxide.

Example IX 200 parts of china clay, 30 parts of zirconium sulfate and 200 parts water were made into a uniform slurry, then dried at about 220° C. The product was broken up and then calcined at about 1000° C. yielding a zirconium oxide coated product useful in ceramic bodies.

Example X 400 parts flint plus 60 parts zirconium sulfate plus 25 parts ammonium vanadate plus 250 parts of water were made into a uniform slurry, dried at about 200 to 250° C. and calcined at about 1000° C. yielding a dark brown ceramic color. This product can be used to produce yellow ceramic color by admixture with a suitable frit, such as that known to the trade as Pemco #349 frit.

Example XI 1350 parts milled zircon, 98% of which will pass a 325 mesh, 920 parts of 94% sulfuric acid and 68 parts of zirconium sulfate were made into a uniform slurry, dried at 150 to 320° C., then calcined at 1000° C. yielding a zirconium oxide coated product in which the coating is enriched with zirconium oxide.

Example XII 100 parts of wood flour of about 50 mesh were mixed with 10 parts of zirconium sulfate dissolved in 1000 parts of water. After thorough mixing, aqueous ammonia was added until the slurry had a pH value of from 8 to 9 whereby hydrous zirconium oxide was deposited on the particles of wood flour. The slurry was then washed with water containing a trace of ammonia and the product was dried at 120° C. whereby the hydrous zirconium oxide was converted to a dried hydrous zirconia in the form of a coating on the wood flour.

In the practice of the present invention, when treating zirconium silicate with sulfuric acid, the temperature at which the zircon is heated and the length of time of treatment will vary depending upon the size of the particles and the thickness of the coating of zirconium oxide to be produced on the finished product. In general, it is desired to use concentrated sulfuric acid and to carry out the treatment at as high a temperature as possible. The temperature at which the sulfuric acid treatment is carried out is generally in the neighborhood of 150 to 400° C. and additional sulfuric acid is added as required. However, if preferred, the reaction can be carried out at higher temperatures, say up to 600° C. and in a closed vessel such as an autoclave. The length of time of treatment will vary with the concentration of the acid employed and the temperature to which the material is heated, but will generally be about six or eight hours or more and may continue for as long as thirty hours if desired. Similarly, when the zirconium sulfate coated particles are calcined, the temperature should be raised above that at which the sulfate will decompose and preferably to a temperature of 800 to 1200° C.

When the zirconium oxide coated particles of the invention are used in producing ceramic colors they may be mixed with any suitable or preferred color imparting metal salts or oxides such as the salts of chromium, vanadium, iron, copper, gold, cobalt, manganese and the like. Further, various fluxing agents such as sodium fluoride, sodium carbonate or other alkaline salts may be employed in the mixture.

While numerous methods of forming a zirconium oxide coating upon particles or bodies of material have been described and various uses of the products have been suggested, it will be apparent that the invention is capable of many modifications and changes and the products obtained have many different applications in industry and the arts. It should, therefore, be understood that the procedures and examples cited above are merely representative of typical embodiments of the invention and are not intended to limit the scope thereof.

I claim:

1. Zirconium silicate particles coated with a mixture of zirconium oxide and silica in substantially equal molar proportions.

2. The method of producing zirconia coated particles which comprises the steps of heating zirconium silicate of about 300 to 400 mesh with concentrated sulfuric acid at a temperature above 300° C. for a period of several hours and until the surface portions only of the zirconium silicate particles have been converted to zirconium sulfate and thereafter calcining the product at a temperature of about 1000° C. until the zirconium sulfate has been converted to zirconium oxide.

3. The method as defined in claim 2 wherein the resulting product is heated with hydrochloric acid and then dried.

4. The method as defined in claim 3 wherein flint is mixed with the zirconium silicate during the treatment thereof with sulfuric acid.

5. The method of producing a ceramic color from zirconium silicate ore which comprises the steps of reducing the ore to a fineness of from about 300 to 400 mesh, mixing the finely divided ore with flint and ammonium vanadate, heating the mixture with concentrated sulfuric acid to a temperature of at least 300° C. for a period of at least 6 hours and the surface portion only of the zirconium silicate has been converted to zirconium sulfate, driving off the sulfuric acid and converting the zirconium sulfate to zirconium oxide in situ on the surfaces of the particles by calcining the treated material at a temperature of about 800 to 1200° C. and firing the resulting mixture to develop color in the product.

6. The method of treating zirconium silicate ore which comprises the steps of reducing the ore to a fineness of at least 200 mesh, adding concentrated sulfuric acid to the reduced ore and heating the mixture for a period of at least 6 hours at a temperature of about 150 to 600° C. and until only the surface portions of the zirconium silicate ore have been converted to zirconium sulfate and thereafter converting the zirconium sulfate to zirconium oxide in situ on the surfaces of the particles of zirconium silicate by calcining the resulting product at a temperature of about 800 to 1200° C.

7. The method of producing particles of zirconium silicate which are coated with zirconium oxide which comprises the steps of comminuting the zirconium silicate, converting the surface portions only of the zirconium silicate particles to zirconium sulfate by heating the zirconium silicate with concentrated sulfuric acid for a period of at least six hours, and thereafter converting the surface layer of zirconium sulfate thus produced to zirconium oxide in situ on the surface of the particles by calcining the sulfate coated particles at a temperature of about 800 to 1200° C.

8. The method of producing a ceramic color which comprises the steps of heating particles of zirconium silicate and particles of flint together in the presence of concentrated sulfuric acid at a temperature of about 150 to 600° C. until the surface portion only of the zirconium silicate has been converted to zirconium sulfate and a portion of said zirconium sulfate has been deposited on the surface of the flint particles, calcining the resulting product at a temperature of about 800 to 1200° C. until the zirconium sulfate on the surfaces of said particles has been converted to zirconium oxide, mixing the calcined product with a color imparting metal compound and an alkaline fluxing agent, and firing the resulting mixture to develop color in the product.

References Cited in the file of this patent

UNITED STATES PATENTS

| | | |
|---|---|---|
| Re. 13,791 | Kreidl | Aug. 25, 1914 |
| 1,502,422 | Cooper | July 22, 1924 |
| 1,618,288 | Kenzie | Feb. 22, 1927 |
| 2,099,019 | Kenzie | Nov. 16, 1937 |
| 2,273,871 | Kenzie | Feb. 24, 1942 |
| 2,438,335 | Earl | Mar. 23, 1948 |
| 2,441,447 | Sealright | May 11, 1948 |

OTHER REFERENCES

"The Industrial Chemist," July 1933, pages 237–239 and 243.